(12) United States Patent
Qiang (10) Patent No.: US 9,794,176 B2
(45) Date of Patent: Oct. 17, 2017

(54) DUPLICATE MAC ADDRESS DETECTION (71) Applicant: Zu Qiang, Kirkland (CA)

(72) Inventor: Zu Qiang, Kirkland (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 167 days.

(21) Appl. No.: 14/367,190

(22) PCT Filed: Jun. 6, 2014

(86) PCT No.: PCT/IB2014/062038
§ 371 (c)(1),
(2) Date: Jun. 19, 2014

(87) PCT Pub. No.: WO2014/203113
PCT Pub. Date: Dec. 24, 2014

(65) Prior Publication Data
US 2015/0016461 A1 Jan. 15, 2015

Related U.S. Application Data (60) Provisional application No. 61/836,406, filed on Jun. 18, 2013.

(51) Int. Cl.
H04L 12/741 (2013.01)
H04L 29/12 (2006.01)
H04L 12/723 (2013.01)

(52) U.S. Cl.
CPC .......... H04L 45/74 (2013.01); H04L 61/2046 (2013.01); H04L 61/6022 (2013.01); H04L 45/50 (2013.01)

(58) Field of Classification Search
None
See application file for complete search history.

(56) References Cited

U.S. PATENT DOCUMENTS 5,519,706 A * 5/1996 Bantz ................. H04L 9/0844
370/329
7,440,424 B2 10/2008 Nam
(Continued)

FOREIGN PATENT DOCUMENTS

GB  WO 03055180 A1 *  7/2003  ....... H04L 29/12018
WO     03/055180 A1     7/2003

OTHER PUBLICATIONS

Sajassi, Aggarwal et al.: "Requirements for Ethernet VPN (E-VPN)"; Oct. 21, 2012; 14 pages. Copy downloaded from Internet on Jun. 17, 2014.
(Continued)

Primary Examiner — Rina Pancholi
(74) Attorney, Agent, or Firm — Ericsson Canada Inc.; David J Rahmer (57) ABSTRACT Systems and methods for differentiating between a duplicate MAC address situation and a multiple MAC address movement situation are provided. A node receives a new MAC address determines if it is a known or unknown MAC address by comparing it with a stored MAC address table. If it is a previously known MAC address, the node initiates a duplicate MAC address detection process to determine if at least one of the duplicate MAC addresses is no longer valid or is the result of a MAC mobility event.

14 Claims, 7 Drawing Sheets (56) References Cited

U.S. PATENT DOCUMENTS

| | | | |
|---|---|---|---|
| 7,706,776 | B2 | 4/2010 | Zheng |
| 8,089,981 | B2 | 1/2012 | Hiraki |
| 2006/0120317 | A1* | 6/2006 | Zheng ............... H04L 29/12216 370/315 |
| 2009/0132701 | A1* | 5/2009 | Snively ............... H04L 12/4625 709/224 |
| 2011/0164505 | A1* | 7/2011 | Salam ................ H04L 43/0811 370/241 |

OTHER PUBLICATIONS

Mahalingam, Dutt et al.: "VXLAN: A Framework for Overlaying Virtualized Layer 2 Networks over Layer 3 Networks"; Aug. 26, 2011; 20 pages. Copy downloaded from Internet on Jun. 17, 2014.
Aggarwal, Sajassi et al.: "BGP MPLS Based Ethernet VPN"; Nov. 11, 2010; 41 pages. Copy downloaded from Internet on Jun. 17, 2014.
Sangli et al.: "BGP Extended Communities Attribute"; Feb. 2006; 12 pages. Copy downloaded from Internet on Jun. 17, 2014.
Rosen & Rekhter: BGP/MPLS IP Virtual Private Networks (VPNs); Feb. 2006; 47 pages. Copy downloaded from Internet on Jun. 17, 2014.
A.Sajassi et al.: "BGP MPLS Based Ethernet VPN"; Feb. 25, 2013; 47 pages.
Murimo Bethel Mutanga et al.: "The Effect of DAD timeout period on Address Auto-configuration in Wireless ad-hoc networks"; Sep. 7, 2011; 6 pages.
International Search Report for PCT/IB2014/062038, dated Sep. 26, 2014; 5 pages.

\* cited by examiner

Figure 1

(Prior Art)

DUPLICATE MAC ADDRESS DETECTION

CROSS-REFERENCE TO RELATED APPLICATIONS

This application claims the benefit of U.S. Provisional Application No. 61/836,406 filed on Jun. 18, 2013 the contents of which are hereby incorporated by reference.

TECHNICAL FIELD

This disclosure relates generally to generally relate to telecommunications and more specifically to techniques for detecting duplicate Media Access Control (MAC) addresses.

BACKGROUND

The telecommunications industry is working on network virtualization solutions. One of the network virtualization solutions, named Ethernet Virtual Private Network (E-VPN), is under discussion in standardization organizations. As discussed in Internet Engineering Task Force (IETF) drafts "BGP MPLS Based Ethernet VPN" draft-ietf-12vpn-evpn and "Requirements for Ethernet VPN (E-VPN)" draft-ietf-12vpn-evpn-req, E-VPN requires extensions to the existing Internet Protocol (IP) and Multi-protocol Label Switching (MPLS) protocols. In addition to these extensions, E-VPN uses several building blocks from existing MPLS technologies.

Figure 1:
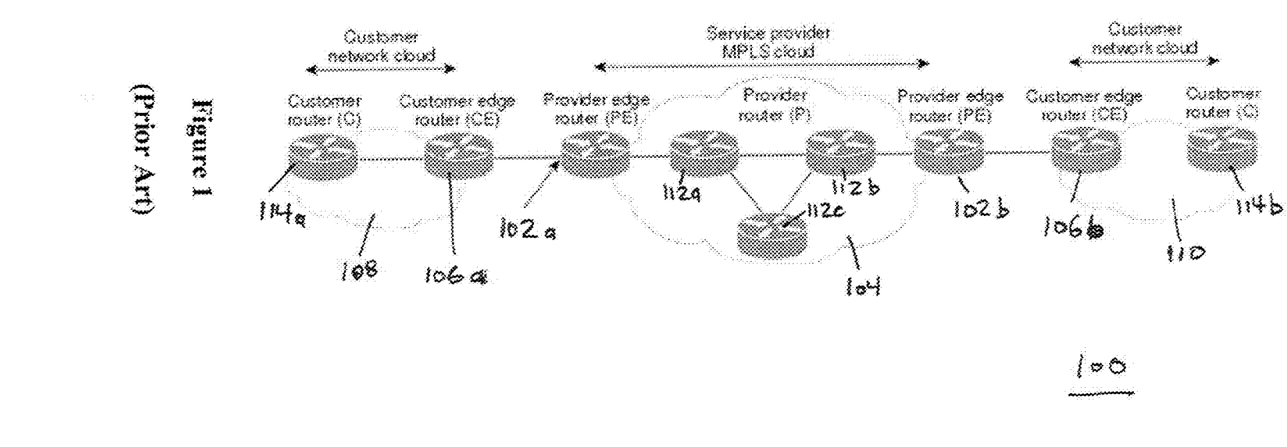
FIG. 1 is a prior art BGP MPLS based E-VPN network.

FIG. 1 shows an overview of a Border Gateway Protocol (BGP) MPLS based E-VPN network 100. Provider Edge (PE) routers 102a and 102b are shown at the edge of a service provider's network 104 in communication with Customer Edge (CE) routers 106a and 106b in various customer networks 108 and 110. The service provider network 104 can also include Provider routers 112a, 112b, 112c and the customer networks 1108 and 110 can include customer routers 114a, 114b. According to the IETF drafts referenced above, Media Access Control (MAC) address learning between PEs can occur in the control plane using multi-protocol (MP) BGP.

In MAC address learning, the source MAC address of each received packet is stored in a MAC address table so that future packets destined for that address can be forwarded only to the interface (e.g. port number) where that address is located.

In E-VPN, a PE (e.g. 102a) will advertise the MAC addresses learned from the CEs (e.g. 106a) that are connected to them, along with an MPLS label, to other PEs (e.g. 102b) in the control plane using MP-BGP. However, learning between PEs and CEs can be done by whatever method is best suited to the CE, which can include data plane learning, IEEE 802.1x, Link Layer Discovery Protocol (LLDP), 802.1aq, Address Resolution Protocol (ARP), management plane or other protocols.

There are two scenarios for MAC address learning—MAC address learning for a new virtual machine (VM) and MAC mobility.

When a new VM is started in a CE, a new MAC address is allocated for that VM. The PE in a particular E-VPN learns the new VM MAC address via data plane learning or control signaling, such as Dynamic Host Configuration Protocol (DHCP) requests. The PE then constructs a BGP E-VPN MAC address advertisement message to advertise these MAC addresses using the MAC Advertisement route type in the E-VPN Network Layer Reachability Information (NLRI) to its peer PEs. Upon receiving the MAC Advertisement, a peer PE shall update its stored MAC address forwarding table accordingly. There is a possibility that a duplicate MAC address can be allocated to a new VM belonging to the same VLAN, but in different Ethernet segments, if there is no centralized MAC address management function in the network.

Alternatively, it is possible for a given host or VM (as defined by its MAC address) to move from one Ethernet segment to another. This is referred to as "MAC Mobility" or a "MAC move". In a MAC move, there would be two sets of MAC Advertisement routes, one set with the new Ethernet segment and one set with the previous Ethernet segment, and the MAC address would appear to be reachable via each of these segments. In this case, the MAC Advertisement routes with the previous Ethernet segment should be withdrawn. There is a possibility that a given MAC address may move between two Ethernet segments multiple times within a short time period, in which case there may be multiple withdrawals and re-advertisements.

In both of the above described cases, there is a potential issue referred to as a MAC address duplication situation. The situation may arise where the same MAC address is learned by different PEs in the same VLAN because of two (or more hosts) being mis-configured with the same, duplicate MAC address. In this situation, the traffic originating from these hosts would trigger continuous MAC moves among the PEs attached to these hosts, which will be detected as the multiple movements. The related situation is that such a "duplicate" MAC address may be detected due to multiple MAC movements.

Therefore, it would be desirable to provide a system and method that obviate or mitigate the above described problems.

SUMMARY

In a first aspect of the present invention, there is provided a method for verifying a duplicate Media Access Control (MAC) address, performed by a network node. The method comprises the steps of receiving a first MAC address through a MAC address learning mechanism; determining that the first MAC address matches a second MAC address stored in a MAC address table, the second MAC address having been previously learned; attempting to reach both the first MAC address and the second MAC address; and responsive to receiving acknowledgement that the first MAC address and the second MAC address are both reachable, re-attempting to reach both the first MAC address and the second MAC address.

In an embodiment of the first aspect, the network node can wait a predetermined period of time prior to re-attempting to reach both the first MAC address and the second MAC address. In another embodiment, the network node can re-attempt to reach both the first MAC address and the second MAC address without reporting a duplicate MAC address situation.

In another embodiment, it can be determined that the first MAC address is not a duplicate MAC address in response to receiving an indication that the second MAC address was not reachable. The MAC address table can be updated by removing the second MAC address from the table and adding the first MAC address to the table.

In another embodiment, it can be determined that the first MAC address is a duplicate MAC address in response to receiving an indication that the second MAC address was reachable. The duplicate MAC address can be reported to a network management system.

In another embodiment, the network node can attempt to reach the first MAC address by transmitting an instruction to a peer node to attempt to reach the first MAC address.

In a second aspect of the present invention, there is provided a network node comprising a processor and a memory, the memory containing instructions executable by the processor whereby the network node is operative to receive, at a communication interface, a first Media Access Control (MAC) address through a MAC address learning mechanism; determine that the first MAC address matches a second MAC address stored in a MAC address table, the second MAC address having been previously learned; attempt to reach both the first MAC address and the second MAC address; and responsive to receiving acknowledgement that the first MAC address and the second MAC address are both reachable, re-attempt to reach both the first MAC address and the second MAC address.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Reference may be made below to specific elements, numbered in accordance with the attached figures. The discussion below should be taken to be exemplary in nature, and not as limiting of the scope of the present invention. The scope of the present invention is defined in the claims, and should not be considered as limited by the implementation details described below, which as one skilled in the art will appreciate, can be modified by replacing elements with equivalent functional elements.

In the above described prior art, it is not possible to distinguish a valid duplicate MAC address situation from a multiple movement situation. It is important to detect the MAC address learning situations and distinguish between the two differing cases, in order to avoid a network signaling crash.

It should be noted that, although some embodiments will be described with respect to the IETF drafts on E-VPN referenced herein, it will be readily apparent to those skilled in the art that these concepts can be extended to other overlay network architectures. Other examples of overlay networks include Provider Backbone Bridging E-VPN (PBB-EVPN), Shortest Path Bridging MAC-in-MAC (SPBM), Virtual Extensible LAN (VxLAN), Network Virtualization using Generic Routing Encapsulation (NVGRE), and others. VxLAN, in particular, is described in IETF draft "VXLAN: A Framework for Overlaying Virtualized Layer 2 Networks over Layer 3 Networks", draft-mahalingam-dutt-dcops-vxlan.

Some embodiments will be described as using BGP control signaling, however those skilled in the art will appreciate that other protocols can be used as appropriate for the different types of overlay networks.

In an overlay network such as E-VPN, a network endpoint (e.g. the PE) maintains an inner-to-outer address mapping table. This table is used for the network end-point to forward any outgoing packets. The inner address is the VM address (e.g. its MAC address). The outer address is the remote network end-point.

Embodiments of the present invention allow for a PE to verify with a peer PE if there is an inner address that was learned from a local CE that matches an address that was received from the peer PE, both inner addresses belonging to the same overlay network. The PE can thus detect the duplicate address situation correctly and avoid exhausting network signaling.

Figure 2:
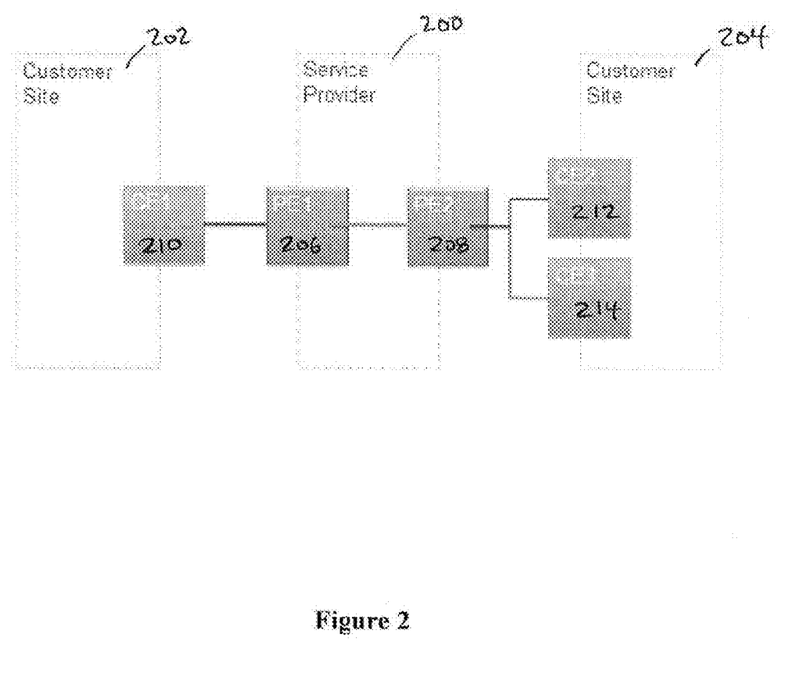
FIG. 2 is a block diagram of an example network architecture.

FIG. 2 illustrates an example network that will be used to describe various embodiments of the present invention. PE1 206 and PE2 208 are Provider Edge nodes in the service provider network 200. CE1 210 is a Customer Edge node, in a first customer network 202, connected to PE1 206. CE2 212 and CE3 214 are Customer Edge nodes, in a second customer network 204, connected to PE2 208.

In a first example, PE2 208 learns a MAC address from CE2 212 on a given Ethernet Tag. Next, PE2 208 performs the MAC address look up in its stored MAC address table. If the MAC address is found, meaning PE2 208 has previously received a MAC address advertisement for the same MAC address from one or more other PEs (e.g. PE1 206) or has learned it from locally connected CE (e.g. CE3 214), it is considered as a known MAC address. Otherwise, the MAC address is considered as an unknown MAC address.

For an unknown MAC address, the handling procedure is the conventional process as specified in the IETF drafts referenced herein, which involves PE2 208 sending a MAC address advertisement to its peer PEs (i.e. PE1 206).

For a known MAC address, a duplicate MAC address detection procedure can be initiated by PE2 208.

If the MAC address was learned from a locally connected different CE, PE2 208 shall perform the MAC address reachability procedure locally with the attached CEs (i.e. CE3 212). For instance, PE2 208 can send a network reachability message (e.g. APR) to the MAC address if the MAC address was learned via the data plane. Or alternatively, PE2 208 can use network signaling to verify if the MAC address is still reachable if the MAC address was learned via the control plane.

If both MAC addresses are reachable, a duplicate MAC address situation is detected. PE2 208 can report it to the network management system. If only one of the MAC addresses is reachable, PE2 208 can update its stored MAC address table accordingly to reflect the verified MAC address.

If the MAC address was learned from a MAC address advertisement from a peer PE (e.g. PE1 206), an alternative procedure can be initiated. PE2 208 shall send a BGP message to the peer PE (PE1 206) from which the MAC address advertisements message was received. The BGP message contains a "MAC reachability Extended Community" parameter. The MAC reachability Extended Community message is new transitive extended community with the format specified in IETF RFC 4360 "BGP Extended Communities Attribute". The type and value shall be allocated by the Internet Assigned Numbers Authority (IANA). After sending the MAC reachability Extended Community message, the PE2 208 waits for a response from PE1 206.

Upon receiving the MAC reachability Extended Community message, PE1 206 performs the MAC address reachability procedure locally with its attached CEs (e.g. CE1 210). For example, PE1 206 can send a network reachability message to the MAC address if the MAC address was learned via data plane. Or PE1 206 can use network signaling to verify if the MAC address is still reachable if the MAC address was learned via the control plane.

If the MAC address is not reachable (for example, if the VM has been removed), PE1 206 sends a NOK response to PE2 208 from which the MAC reachability Extended Community was received. The NOK response message indicates to PE2 208 that the MAC address advertisement route which was sent at an early time is no longer valid and it is withdrawn. Upon receiving this NOK response, PE2 208 can update its MAC address table and send MAC address advertisement messages to each of its peer PEs (e.g. PE1 206) as specified in the IETF draft "BGP MPLS Based Ethernet VPN" draft-ietf-12vpn-evpn.

If the MAC address is reachable, PE1 206 shall send an OK response to PE2 208 from which the MAC reachability Extended Community was received. The OK response message indicates to PE2 208 that the MAC address advertisements route which was sent at an early time is still valid. Upon receiving this OK response, a duplicate MAC address situation is detected. PE2 208 can then report it to the network management system. Optionally, PE2 208 may retry the MAC address reachability detection procedure by re-sending the MAC reachability Extended Community after a configurable time delay. This is to distinguish a duplicate MAC address situation from a multiple movement situation.

An alternative to using BGP messages for MAC address learning from a peer PE, is that the PE (PE2 208) may send a network reachability message to the MAC address in the remote PE (PE1 206) for MAC address reachability detection. The network reachability message is sent as a data plane packet. If the remote MAC is reachable, a duplicate MAC address situation is detected and PE2 208 can report it to the network management system. If the remote MAC is not reachable, PE2 208 can update its MAC address table accordingly.

An alternative to using BGP messages as the MAC address learning mechanism from a peer PE, is to report the issue to a centralized network controller. The network controller can make the decision if it knows there is a MAC mobility or out of controlled MAC allocation.

Figure 3:
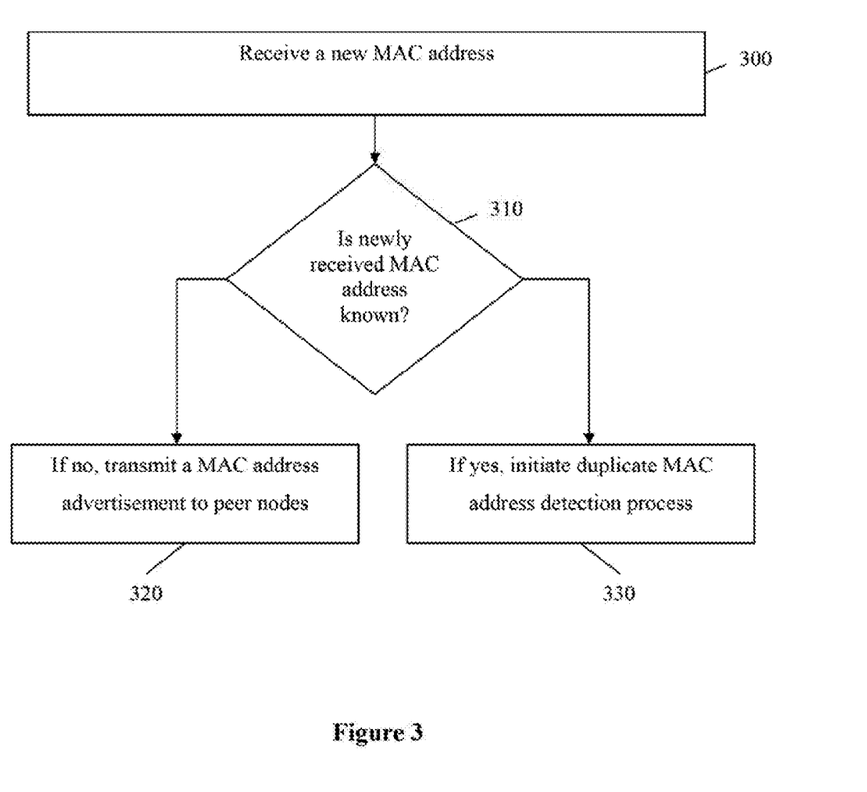
FIG. 3 is a flow chart illustrating a method for detecting a duplicate MAC address situation.

FIG. 3 is an example process for detecting a duplicate MAC address situation according to some embodiments of the present invention. The process begins with obtaining or receiving a new MAC address (block 300). It is determined if the newly received MAC address matches a previously received MAC address by looking up the newly received MAC address in a stored MAC address table (block 310). If the newly received MAC address is determined to be unknown, MAC address advertisement messages can be sent to any peer nodes (block 320). If the newly received MAC address is known (i.e. it matches a previously received MAC address), a duplicate MAC address detection process can be initiated (block 330). The duplicate MAC address detection process can include determining if the matching previously received MAC address was received from a locally connected node or if it was received as a MAC address advertisement from a peer node.

Figure 4A:
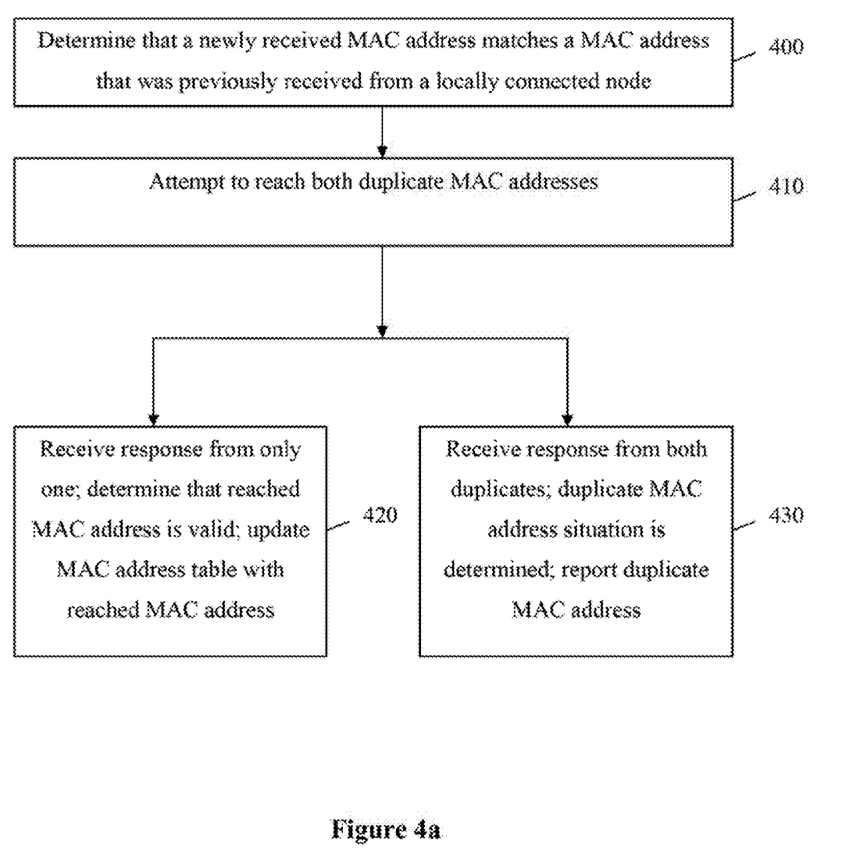
FIG. 4a is a flow chart illustrating a method for initiating a duplicate MAC address detection process at a locally connected node.

FIG. 4a is flow chart illustrating initiating a duplicate MAC address detection process at a locally connected node according to some embodiments of the present invention. The process begins by determining that a newly received MAC address at a node matches a MAC address that was previously received from a locally connected node (block 400). A MAC address reachability procedure is performed with the locally connected nodes by attempting to reach both of the duplicate MAC addresses (block 410). If a response is received from only one of the duplicate MAC addresses, it is determined that the reachable MAC address is valid (block 420). The MAC address table can be updated accordingly with the valid MAC address. If both duplicates are reachable, and respond, a duplicate MAC address situation is determined and can be reported to the network management system (block 430).

Figure 4B:
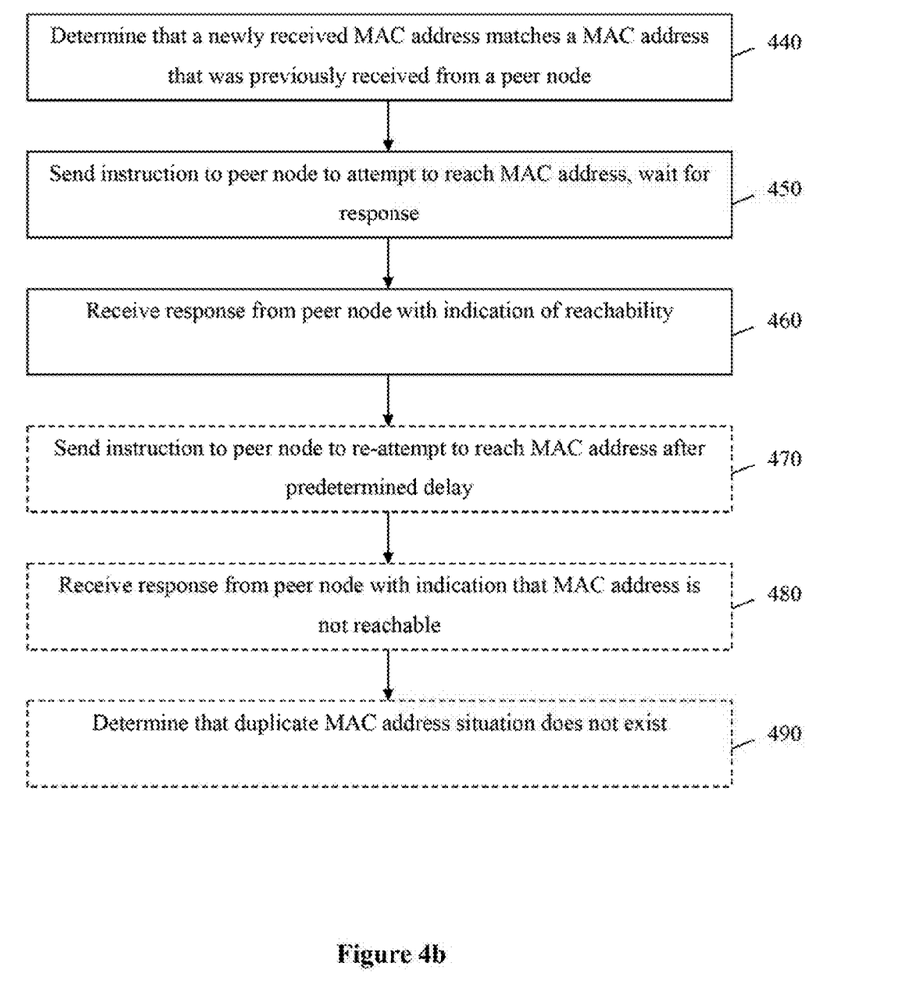
FIG. 4b is a flow chart illustrating a method for initiating a duplicate MAC address detection process at a peer node.

FIG. 4b is flow chart illustrating initiating a duplicate MAC address detection process at a peer node according to some embodiments of the present invention. The process begins by determining that a newly received MAC address at a node matches a MAC address that was previously received from a peer node via a MAC address advertisement (block 440). A message is sent to the peer node instructing the peer to attempt to reach the MAC address (block 450). The node waits for a response while the peer node performs its MAC address reachability procedure locally. A message is received from the peer node indicating if the MAC address was reachable or not (block 460). If the response from the peer node indicates that the MAC address was not reachable, the MAC address table can be updated in accordance with the newly received MAC address, similar to as was discussed with respect to block 420. The node can then send a MAC advertisement message to any peer nodes. Alternatively, if the response from the peer node indicates that the MAC address was reachable, a duplicate MAC address situation is detected. In this case, the node can report the duplicate situation to the network management system, similar to as was discussed with respect to block 430.

Optionally, the node may not immediately report the duplicate situation to the network management system. The node can optionally verify the duplicate MAC address prior to reporting it. The node may be configured to re-try the MAC address reachability procedure after a predetermined delay in order to avoid a multiple movement situation being detected as a duplicate MAC address situation. Following a predetermined period of time, the node can send a subsequent instruction to the peer node to re-attempt to reach the MAC address a second time (block 470). If the peer node responds to indicate that the MAC address was not reachable on the subsequent attempt (block 480), it is determined that a duplicate MAC address situation does not exist (block 490). The MAC address table can be updated in accordance with the newly received MAC address. In the example embodiment illustrated in blocks 470, 480, 490, an initially detected duplicate MAC address was verified and determined to not exist without unnecessarily reporting the situation to the network management system. However, if the peer node responds to indicate that the MAC address remained reachable on the subsequent re-attempt, a duplicate MAC address situation is determined to be valid and can then be reported.

The optional MAC address reachability re-attempt (block 470) can be performed iteratively. A time delay between iterative attempts can be configured appropriately.

Figure 5:
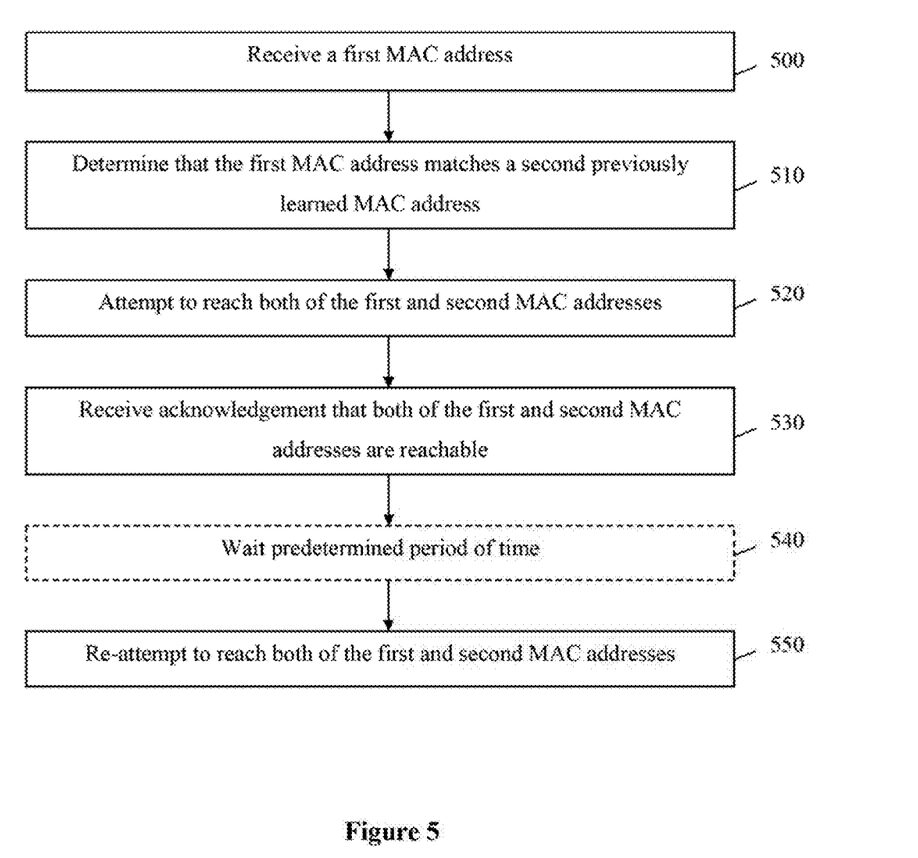
FIG. 5 is a flow chart illustrating a method for verifying a duplicate MAC address.

FIG. 5 illustrates a method for verifying a duplicate MAC address according to some embodiments of the present invention. The method of FIG. 5 can be executed by a network node in an overlay network. The method begins by receiving or obtaining a first MAC address (block 500) through a MAC address learning mechanism. The first MAC address can be learned via data plane or control plane signaling. The first MAC address can be an inner address of a virtual machine in the overlay network. It is determined that the first MAC address matches a second MAC address stored in a MAC address table, the second MAC address having been previously learned (block 510). The network node attempts to reach both the first MAC address and the second MAC address (block 520). If the MAC address was learned from a locally connected node, the network node can send a reachability message to the MAC address. If the MAC address was learned from a peer node, the network node can send an instruction message to the peer node. The instruction message can include a request that the peer node sends a reachability message to the specified MAC address.

Acknowledgement is received that both the first MAC address and the second MAC address are reachable (block 530). The acknowledgement can be received as a response from a local or peer node that the attempt to reach the first or second MAC address was successful. The network node can optionally wait for a predetermined period of time (block 540). Responsive to receiving the acknowledgement that the first and second MAC addresses were both reachable, the network node then re-attempts to reach both the first MAC address and the second MAC address (block 550) in order to verify if a duplicate MAC address situation does in fact exist. The network node can re-attempt to reach both the first and second MAC addresses without reporting the initially detected duplicate MAC address situation.

Responsive to receiving an indication that the second MAC address was not reachable on the re-attempt, the network node can determine that the first MAC address is not a duplicate MAC address. The stored MAC address table can be updated by removing the second MAC address from the table and adding the first MAC address to the table.

Responsive to receiving an indication that the second MAC address was reachable on the re-attempt, the network node can determine that the first MAC address is a duplicate MAC address. The duplicate MAC address can be reported to a network management system.

Figure 6:
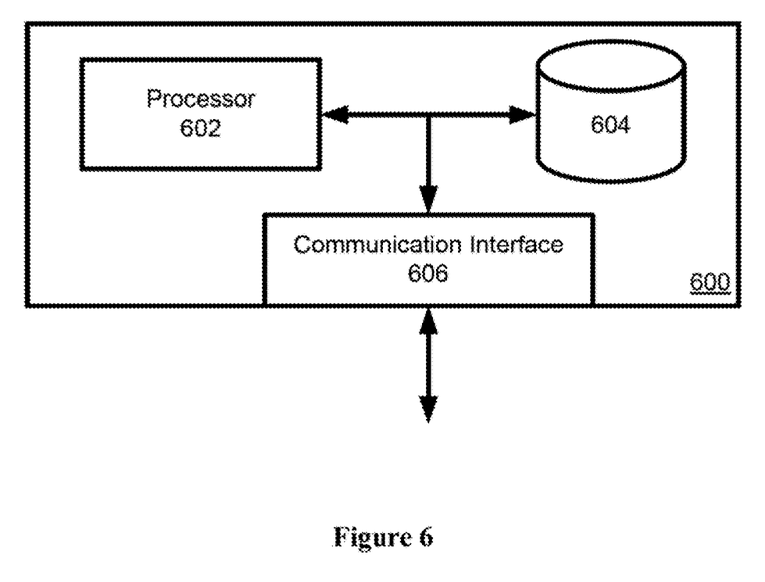
FIG. 6 is a block diagram illustrating an example network node.

FIG. 6 is a block diagram of a network node 600 that can implement the various embodiments of the present invention as described herein. Node 600 can be a PE node or CE node as were illustrated in FIG. 2. Node 600 includes a processor 602, a memory or data repository 604, and a communication interface 606. The memory 604 contains instructions executable by the processor 602 whereby the node 600 is operative to perform the various methods and processes described herein. The communication interface 606 is configured to send and receive messages. The processor 602 is configured to compare a MAC address received via the communication interface 606 with at least one previously received MAC address stored in memory 604 to determine if a duplicate MAC address situation exists. The processor 602 is configured to initiate MAC address reachability procedures with both locally connected nodes and peer nodes.

Network node 600 is operative to receive, at communication interface 606, a first MAC address through a MAC address learning mechanism. Node 600 determines that the first MAC address matches a second MAC address stored in a MAC address table in memory 604, the second MAC address having been previously learned. Node 600 attempts to reach both the first MAC address and the second MAC address. This can include sending reachability instructions via the communication interface 606. Responsive to receiving acknowledgement that the first MAC address and the second MAC address were both reachable, node 600 re-attempts to reach both the first MAC address and the second MAC address, optionally after waiting a predetermined period of time and optionally without reporting that a duplicate MAC address situation has been detected.

Embodiments of the present invention allow a network node to detect a MAC address duplication using either control signaling or data plane. The network node can distinguish a true duplicate MAC address situation from a multiple movement situation. This can avoid exhaustive network signaling and limits the impacts on PE nodes with no additional BGP signaling required.

Embodiments of the invention may be represented as a software product stored in a non-transitory machine-readable medium (also referred to as a computer-readable medium, a processor-readable medium, or a computer usable medium having a computer readable program code embodied therein). The machine-readable medium may be any suitable tangible medium including a magnetic, optical, or electrical storage medium including a diskette, compact disk read only memory (CD-ROM), digital versatile disc read only memory (DVD-ROM) memory device (volatile or non-volatile), or similar storage mechanism. The machine-readable medium may contain various sets of instructions, code sequences, configuration information, or other data, which, when executed, cause a processor to perform steps in a method according to an embodiment of the invention. Those of ordinary skill in the art will appreciate that other instructions and operations necessary to implement the described invention may also be stored on the machine-readable medium. Software running from the machine-readable medium may interface with circuitry to perform the described tasks.

The above-described embodiments of the present invention are intended to be examples only. Alterations, modifications and variations may be effected to the particular embodiments by those of skill in the art without departing from the invention, which is defined solely by the claims appended hereto.

What is claimed is:

1. A method for verifying a duplicate Media Access Control (MAC) address, performed by a network node, the method comprising:
   receiving a first MAC address from a first node through a MAC address learning mechanism;
   determining that the first MAC address matches a second MAC address stored in a MAC address table, the second MAC address having been previously learned from a second node;
   attempting to reach both the first MAC address and the second MAC address by sending a first reachability message to each of the first and second nodes;
   responsive to receiving acknowledgement that the first MAC address and the second MAC address are both reachable, re-attempting to reach both the first MAC address and the second MAC address by sending a second reachability message to each of the first and second nodes without reporting a duplicate MAC address situation; and
   determining whether the first MAC address is a duplicate MAC address in accordance with receiving an indication that the second MAC address was reachable or not reachable by the second reachability message.

2. The method of claim 1, further comprising, responsive to receiving acknowledgement that the first MAC address and the second MAC address are both reachable, waiting a predetermined period of time prior to re-attempting to reach both the first MAC address and the second MAC address.

3. The method of claim 1, wherein, responsive to receiving an indication that the second MAC address was not reachable by the second reachability message, it is determined that the first MAC address is not a duplicate MAC address.

4. The method of claim 3, further comprising, updating the MAC address table by removing an entry associated with the second MAC address from the table and adding an entry associated with the first MAC address to the table.

5. The method of claim 1, wherein, responsive to receiving an indication that the second MAC address was reachable by the second reachability message, it is determined that the first MAC address is the duplicate MAC address.

6. The method of claim 5, further comprising reporting the duplicate MAC address to a network management system.

7. The method of claim 1, wherein sending the first reachability message includes transmitting an instruction to the first node to attempt to reach the first MAC address.

8. A network node comprising a processor and a memory, the memory containing instructions executable by the processor whereby the network node is operative to:
  receive, at a communication interface, a first Media Access Control (MAC) address from a first node through a MAC address learning mechanism;
  determine that the first MAC address matches a second MAC address stored in a MAC address table, the second MAC address having been previously learned from a second node;
  attempt to reach both the first MAC address and the second MAC address by sending a first reachability message to each of the first and second nodes;
  responsive to receiving acknowledgement that the first MAC address and the second MAC address are both reachable, re-attempt to reach both the first MAC address and the second MAC address by sending a second reachability message to each of the first and second nodes without reporting a duplicate MAC address situation; and
  determine whether the first MAC address is a duplicate MAC address in accordance with receiving an indication that the second MAC address was reachable or not reachable by the second reachability message.

9. The network node of claim 8, further operative to, responsive to receiving acknowledgement that the first MAC address and the second MAC address are both reachable, wait a predetermined period of time prior to re-attempting to reach both the first MAC address and the second MAC address.

10. The network node of claim 8, wherein, responsive to receiving an indication that the second MAC address was not reachable by the second reachability message, it is determined that the first MAC address is not a duplicate MAC address.

11. The network node of claim 10, further operative to update the MAC address table by removing an entry associated with the second MAC address from the table and adding an entry associated with the first MAC address to the table.

12. The network node of claim 8, wherein, responsive to receiving an indication that the second MAC address was reachable by the second reachability message, it is determined that the first MAC address is the duplicate MAC address.

13. The network node of claim 12, further operative to report the duplicate MAC address to a network management system.

14. The network node of claim 8, wherein sending the first reachability message includes transmitting, by the communication interface, an instruction to the first node to attempt to reach the first MAC address.

\* \* \* \* \*